(12) United States Patent
Knighton et al.

(10) Patent No.: US 6,985,145 B2
(45) Date of Patent: Jan. 10, 2006

(54) GRAPHICAL INTERFACE FOR MANIPULATION OF 3D MODELS

(75) Inventors: Mark S. Knighton, Santa Monica, CA (US); Todd C. Moyer, Los Angeles, CA (US); Kent E. Sidney, Los Angeles, CA (US); William D. McKinley, Marina Del Rey, CA (US)

(73) Assignee: NextEngine, Inc., Santa Monica, CA (US)

( * ) Notice: Subject to any disclaimer, the term of this patent is extended or adjusted under 35 U.S.C. 154(b) by 566 days.

(21) Appl. No.: 09/990,829

(22) Filed: Nov. 9, 2001

(65) Prior Publication Data

US 2003/0103064 A1 Jun. 5, 2003

(51) Int. Cl.
*G06T 15/00* (2006.01)

(52) U.S. Cl. ..................... 345/428; 382/113

(58) Field of Classification Search ............... 345/418, 345/419, 428, 619; 382/113, 112, 111
See application file for complete search history.

(56) References Cited

U.S. PATENT DOCUMENTS

| 5,971,589 A | 10/1999 | Hazama et al. ........ 364/472.01 |
| 6,134,338 A | 10/2000 | Solberg et al. ............. 382/113 |
| 6,687,329 B1 * | 2/2004 | Hsieh et al. .................. 378/62 |

* cited by examiner

*Primary Examiner*—Phu K. Nguyen
(74) *Attorney, Agent, or Firm*—Blakely, Sokoloff, Taylor & Zafman, LLP

(57) ABSTRACT

A method comprising analyzing a data file representing a three dimensional object to automatically identify a plurality of views of interest based on at least one observable characteristic of the three dimensional object; and defining an access mechanism to permit the plurality of views to be accessed.

27 Claims, 7 Drawing Sheets

GRAPHICAL INTERFACE FOR MANIPULATION OF 3D MODELS

BACKGROUND

1. Field of the Invention

The invention relates to computer software. More specifically, the invention relates to rendering three dimensional models in a networked environment.

2. Background

Various well known methods for analyzing three-dimensional models of three-dimensional objects exist such as wavelet transforms, neural learning techniques, statistical filtering, and fuzzy algorithms. These methods are generally found in specialized software tools adapted to solve problems in particular industry segments, such as analyzing gene expression or satellite image data. These tools have several drawbacks, however.

First, specialized tools are by their nature inflexible. They require modification in order to work with different types of data. In addition, specialized tools typically function only in a stand-alone computing environment and are thus unable to be harnessed by other software processes. Second, to use such tools effectively, one must possess knowledge of a particular industry segment and, often times, understand the mathematical underpinnings of the image analysis techniques employed. The inflexibility and complexity of such tools render them impractical for the average user.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Figure 1:
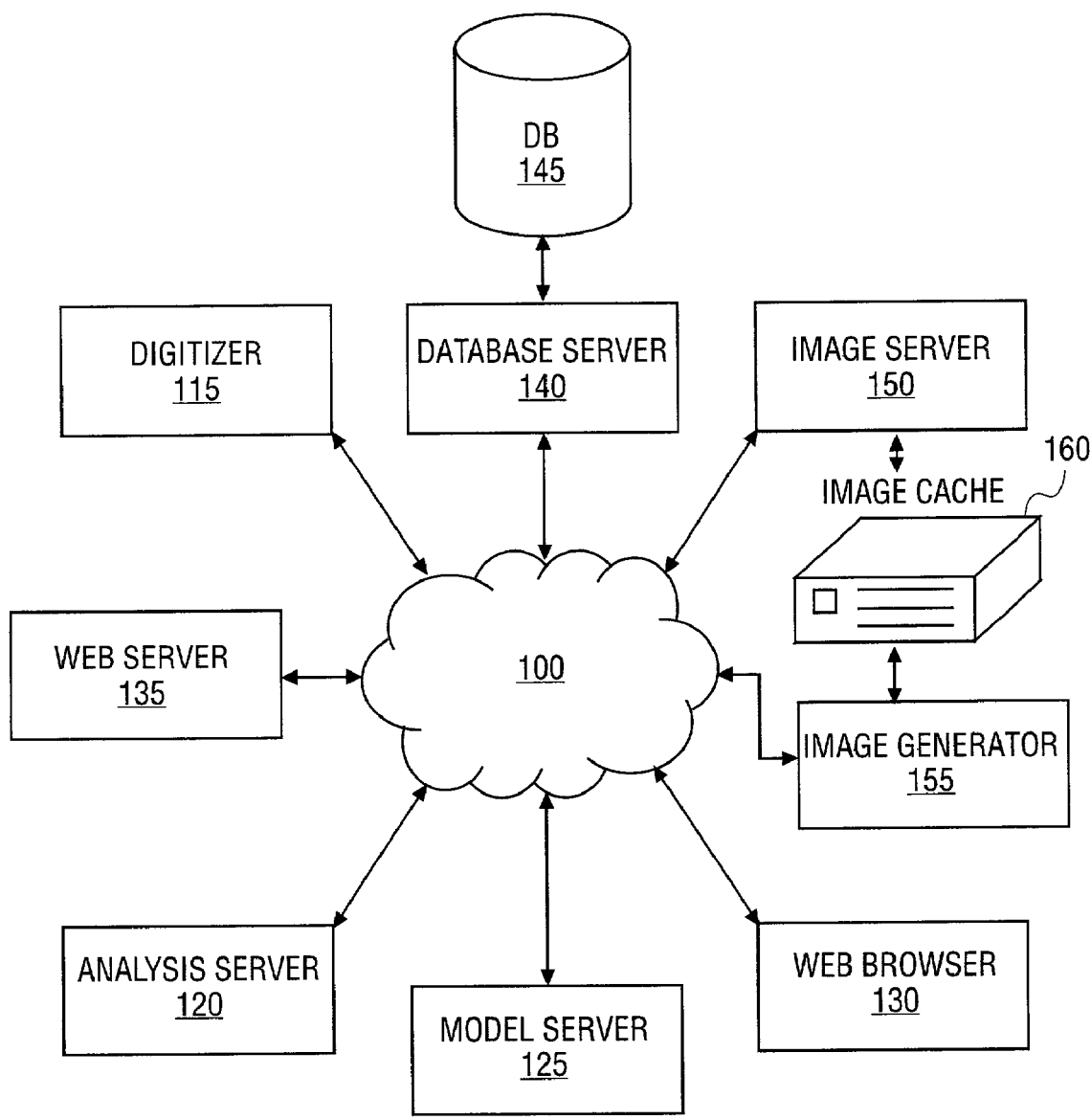
FIG. 1 presents an overview of one embodiment of the invention.

FIG. 1 presents an overview of one embodiment of the invention. A distributed network 100 such as the Internet provides an interconnection between a plurality of processes 115, 120, 125, 130, 135, 140, 150, and 155 that may each consist of more than one process, and that may each reside on different computers connected to the distributed network 100. A computer may be a laptop, desktop, hand-held, server, workstation, internet appliance, or any other device capable of forwarding data across the distributed network.

In one embodiment, database server 140 stores and retrieves image data via a model database 145. A three-dimensional ("3D") object is scanned by digitizer 115. One suitable digitizer is described in co-pending patent application Ser. No. 660,809, entitled DIGITIZER USING INTENSITY GRADIENT TO IMAGE FEATURES OF THREE-DIMENSIONAL MODELS. Digitizer 115 creates a digital representation (or model) of the physical object which it then transfers to model server 125. Alternatively, a file containing a 3D representation of an object may be provided without the use of the digitizer. Model server 125 stores the model in the model database 145 via database server 140, then instructs analysis server 120 to perform some preliminary analysis of the model, which may include automatically identifying orthogonal views or other views of interest and automatic categorization based on observable characteristics. The results of the analysis are stored in the model database 145 so that they may be retrieved along with the model.

In one embodiment, scale-adjusted two-dimensional ("2D") views of models stored in model database 145 are automatically manufactured by image generator 155 in response to requests from image server 150. Image generator 155 stores scale-adjusted views in image cache 160 to speed delivery of subsequent requests for the same view. The image cache may be implemented in software or, in another embodiment, as a combination of dedicated hardware and software. Scale-adjusted views may be used in the creation of soft buttons or other actuatable controls to permit automatic access to the view represented. For example, the scale-adjusted view may be used to label the soft buttons to indicate a view rendered responsive to actuation of a soft button. Scale-adjusted views are deemed to include without limitation line art representations, photographic representations, and iconic representations. In another embodiment, names are given to each view (e.g., front, back, top, etc.) and the name is associated with an actuatable control such as a soft button or hyperlink, the actuation of which causes the view to be rendered. In one embodiment, responsive to actuation of a control, the system displays an animation of the object from a currently displayed view to the view corresponding to the control. In another embodiment, the displayed image snaps directly to the view corresponding to the control.

A model and its views can be accessed via web browser 130. Web browser 130 directs web server 135 to generate a web page containing one or more 3D or scale-adjusted views of a model. A web page is a document on the World Wide Web, usually a file containing hypertext mark-up language ("HTML"), extensible mark-up language ("XML"), related scripts, and hyperlinks to other web pages. The web browser 130 receives the web page from web server 135 and then renders it. The web page has the capability of allowing a user to view and manipulate the model stored in model database 145. In another embodiment, other application programs besides web browsers can access the model and its views.

Stored Model Information

Figure 2:
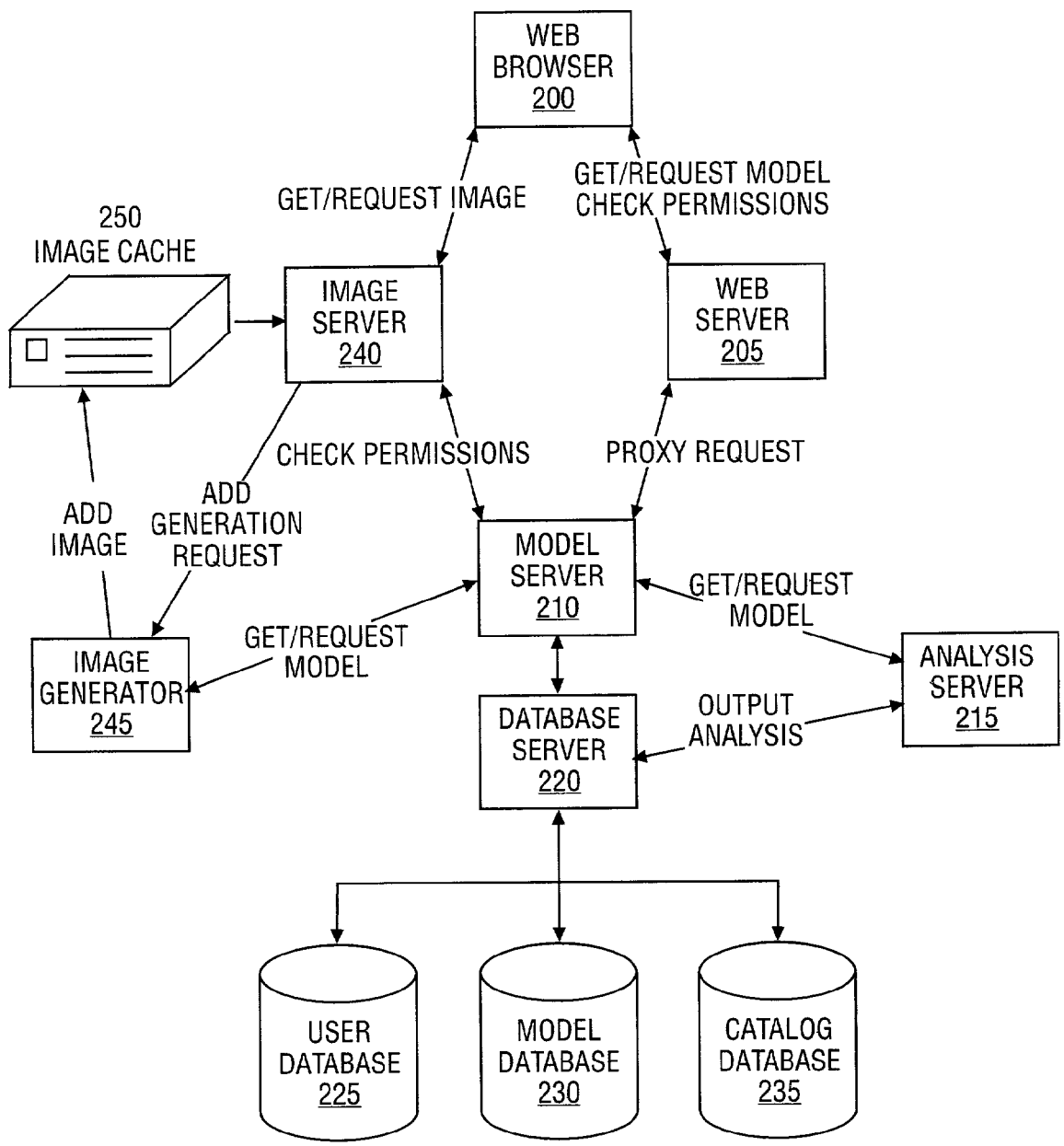
FIG. 2 is a flow diagram of server operation in one embodiment of the invention.

FIG. 2 is a flow diagram of server operation in one embodiment of the invention. In one embodiment, a database server 220 stores information in three databases 225, 230, and 235. The databases may be local to the computer on which the database server 220 is running or could be located on different computers attached to the distributed network 100. A database is a data structure for associating information and can be implemented in a number of ways, including but not limited to a relational database, an object-oriented database, or any combination thereof. The information stored in each database could be combined into a single database, or further subdivided into additional databases. The database server 220 is responsible for storing and retrieving information from each database.

Each model's information is stored in the model database 230 and may include its 3D geometry, a 2D texture map, model permissions, view definitions, and a light map. The geometry is a set of 3D points that, when connected by lines, form polygons establishing the surface of the physical object. The texture map specifies the surface texture of each polygon in the geometry. The light map indicates the effect of a light source on the model. The light map defines both the position of the light source, its brightness, and what the camera sees in reflections. During model rendering, the texture map is combined with the light map based on each polygon's degree of opacity and reflectivity. The light map can be adjusted to give different effects such as making models of metallic objects appear shiny or dull, or creating sparkles in glass. In one embodiment, the light map is automatically adjusted to improve the visibility of features of interest such as by illuminating the model along the primary viewing axis. Another embodiment could alter the light map to highlight the user's defined "favorite" view.

Additionally, the model information in the model database 230 may contain a background image, a color reference image for color calibration of a user's display device, and a scale reference to give the user a sense of the physical object's scale. The scale reference could be dimensional lines, coordinates, a grid, or a 2D image. In another embodiment, the scale reference could be 3D model. In yet another embodiment, non-observable model attributes (e.g., weight, material composition, etc.) could also be stored.

Scale-adjusted 2D views of models may be stored in image cache 250. Views are manufactured from view definitions by image generator 245 under the direction of image server 240. A view V is defined as <(rx, ry, rz), (tx, ty), m>, where (rx, ry, rz) are Euler rotations of the model, (tx, ty) is the translation of the model (movement on a plane perpendicular to the camera), and m is the magnification of the model. This method assumes a stationary camera. In another embodiment, V is defined as <($x_1$, $y_1$, $z_1$), ($x_2$, $y_2$, $z_2$), f>, where ($x_1$, $y_1$, $z_1$) is the camera position, ($x_2$, $y_2$, $z_2$) is the camera target location, and f is the field of view of the camera. This method assumes a stationary model.

Automatic and Default Categorization of Models

In one embodiment, models can be automatically organized into categories by the analysis server 215. Model categories are based on the notion of a trait which is defined as the pair <a, v>, where a is an attribute and v is its value. Attributes may include the overall geometrical shape of the model, surface features as found in the model's 2D texture map such as indicia of the object and color, and local detail which includes geometric and textual information for a specific region of the model. In the case of the overall geometrical shape of the model, the value v could be an equation defining the shape or it could be a 3D geometry. In another embodiment, attributes may be based on non-observable features of a model as well, such as its physical weight, material composition, etc.

A model category may be defined as a logical expressing based on traits that define the category. Categories may be stored in catalog database 235. For example, a jewelry "ring" category might be defined <overall geometry=torus and texture=metallic and color=(gold or silver)>. In one embodiment, the analysis server 215 categorizes a given model based on user-defined default categories. Alternatively, the analysis server 215 can create categories on the fly using image pattern analysis to determine which features a given collection of models has in common. Image pattern analysis techniques are well known in the art and can include wavelet transforms, neural learning techniques, statistical filtering, and fuzzy algorithms.

Automatic Identification of Views of Interest

A view of interest is a view of the model revealing observable features that most likely would be of interest to a user. In one embodiment, the analysis server 215 can automatically identify views of interest based on homogeneity exceptions. A homogeneity exception is a region of non-uniformity in a model's local geometry, gross geometry, or texture map. Well known image pattern analysis techniques are used to identify regions of non-uniformity. The resulting view definitions of these regions can be stored in the model database 230 and subsequently accessed by a user.

In another embodiment, the analysis server 215 may identify views of interest by analyzing the volumetric distribution of features. A feature is defined as the pair <trait, region>, where trait is an attribute value pair <a, v>, and region defines an area of the model surface that contains the feature. A model's features can be identified as a byproduct of automatic categorization or through analysis of a predefined set of traits. In another embodiment, features can be stored in the model database 230 to prevent duplicating analysis of the same features in the future. One method for determining the volumetric distribution of features is based on where features are clustered on the model. For example, if the model was of a toaster including its power cord, the features of interest would be presumably located on the toaster itself, not its power cord. Therefore, views may be generated of the toaster, omitting the power cord. In another embodiment, the volumetric distribution can be determined based on the model's category. For example, if model 310 matched the category defining a toaster, the analysis server 215 would automatically know that features would be clustered on views of the model excluding the power cord. No further analysis beyond automatic categorization would be required.

In another embodiment, the analysis server 215 may identify views of interest by determining a primary viewing axis for presentation of the model. A primary viewing axis is perpendicular to the side of the model that presents the best overall view to the user. Views can be automatically constructed to reveal features of this side of the model. One method for determining the best overall view is based on where features are clustered on the model. The primary viewing axis can be perpendicular to the area of highest feature concentration. In another embodiment, the primary view axis can be perpendicular to the side of the model with the largest surface area. For example, if given the model of the twenty dollar bill 310 in FIG. 3, this method would manufacture views of the front and back, not the top, bottom, and sides. In yet another embodiment, the primary viewing axis can be perpendicular to a point on the model that, volumetrically speaking, would divide the model into two equal volumes if a plane were to pass through the point.

Automatic View Reduction

In one embodiment, the analysis server 215 can automatically eliminate duplicate views. Duplicate views may arise if an object has areas of symmetry. If such is the case, only one view is needed to render the other identical views. In another embodiment, the portions of the model corresponding to the redundant views can also be eliminated. Eliminating redundant model information saves storage space and reduces the time it takes to transfer a model between processes across a distributed network.

The analysis server 215 can also eliminate views that contain information below a certain threshold (so called "empty" views). For example, model 310 has no useful information in four of its six orthogonal views. Therefore, the four empty views could be deleted. In another embodiment, those parts of the model corresponding to the four empty views could also be deleted. The information content threshold could be a function of the number of features in a view or the surface area shown by the view as compared to the other views of the model. When the number of features or the surface area fall below a certain threshold, the view can be deleted. Alternatively, rather than merely the number of features, the number of unique features may be used to reduce redundant views.

Model Queries

In one embodiment, a query is defined as a logical expression involving traits. A query result is a set of view definitions in which each view contains traits satisfying the query. Query analysis may be performed in response to real-time user interaction with the model. The analysis server 215 processes user queries using well known image pattern analysis techniques and generates query results. The query result view definitions allow a user to directly navigate to all occurrences of the queried traits. In another embodiment, the analysis server 215 reuses discovered features from previous queries to avoid duplicating prior analysis. In yet another embodiment, each view in the query result will have highlighted the location of features in that view.

In one embodiment, model server 210 coordinates all activity between web browser 200, analysis server 215, and database server 220. Model server 210 is used by web server 205 and image generator 245 to retrieve and manipulate models stored in the model database 230. In addition, model server 210 directs the analysis and storage of newly digitized models. In another embodiment, the server processes 205, 210, 215, 220, 240, 245 and web browser 200 may all execute on the same computer. The primary purpose behind the model server 210 is to improve overall system performance by caching recently accessed models and model analysis results. For example, suppose a great number of users desire to view and analyze a model simultaneously. The analysis server and the database server would be repeating potentially time-consuming operations for each web browser 200 that accessed the model. This would result in degraded performance and have the effect of limiting the number of users that could view the model. To prevent this from happening, the model server 210 caches its recent transactions between the analysis server 215 and the database server 220. Thus, if a request from a web browser 200 can be satisfied from the contents of the cache, the model server 210 need not forward the request to the analysis server 215 or the database server 220.

In one embodiment, web browser 200 is used to display and manipulate models. More than one web browser can connect to the web server 205 at the same time. Web server 205 forwards requests for models from web browser 200 to model server 210. Web server 205 likewise forwards model data responses from model server 210 to web browser 200. Web browser 200 initially sends a request to web server 205 for a web page containing a model or scale-adjusted views of one or more models. The web server 205 responds with the web page containing the requested information. Thereafter, the web browser 200 directs model server 210 to perform queries on the model via web server 205.

User Interaction

Figure 3:
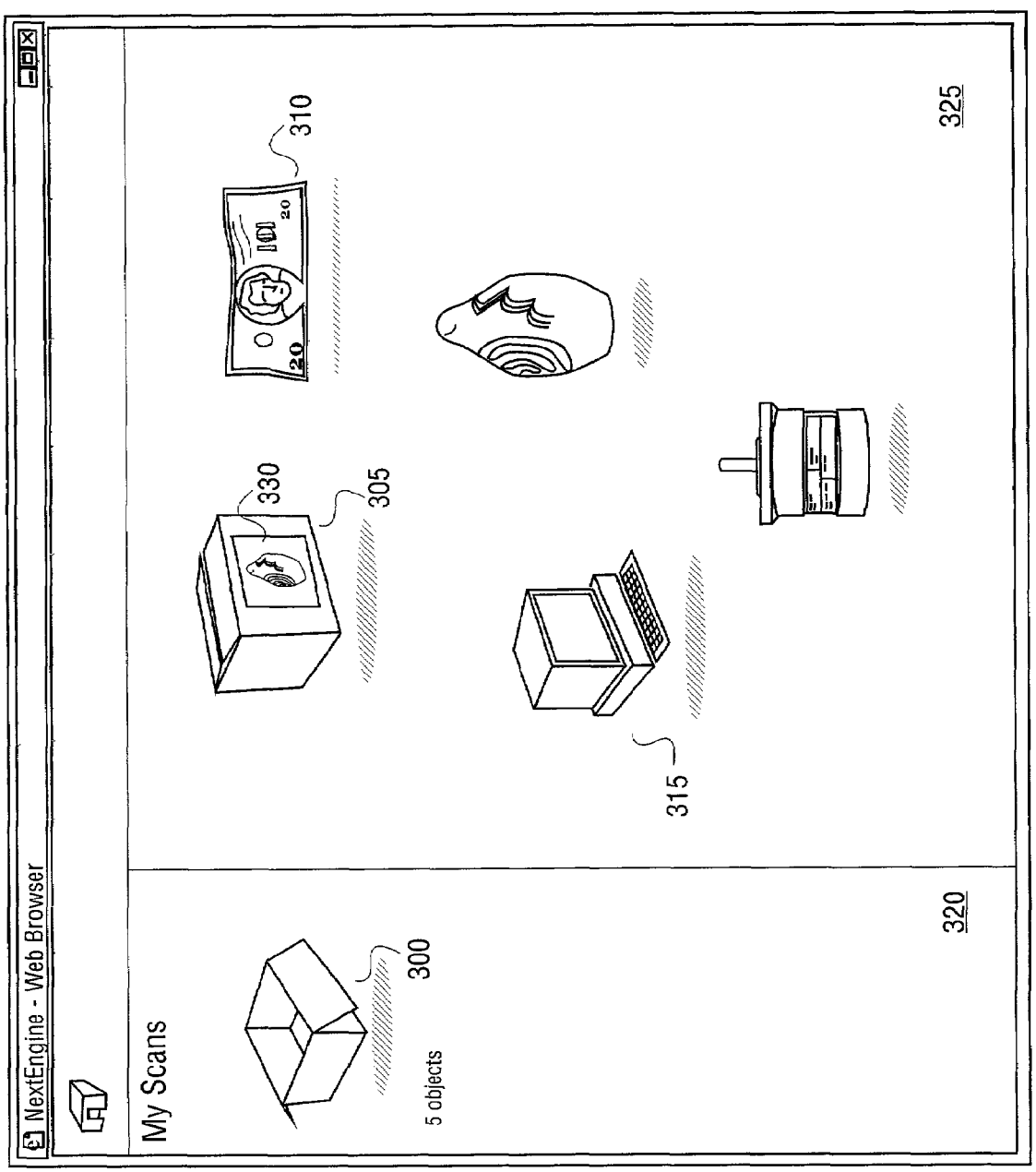
FIG. 3 is a graphical user interface for browsing three-dimensional models as a two-dimensional array in one embodiment of the invention.
Figure 7:
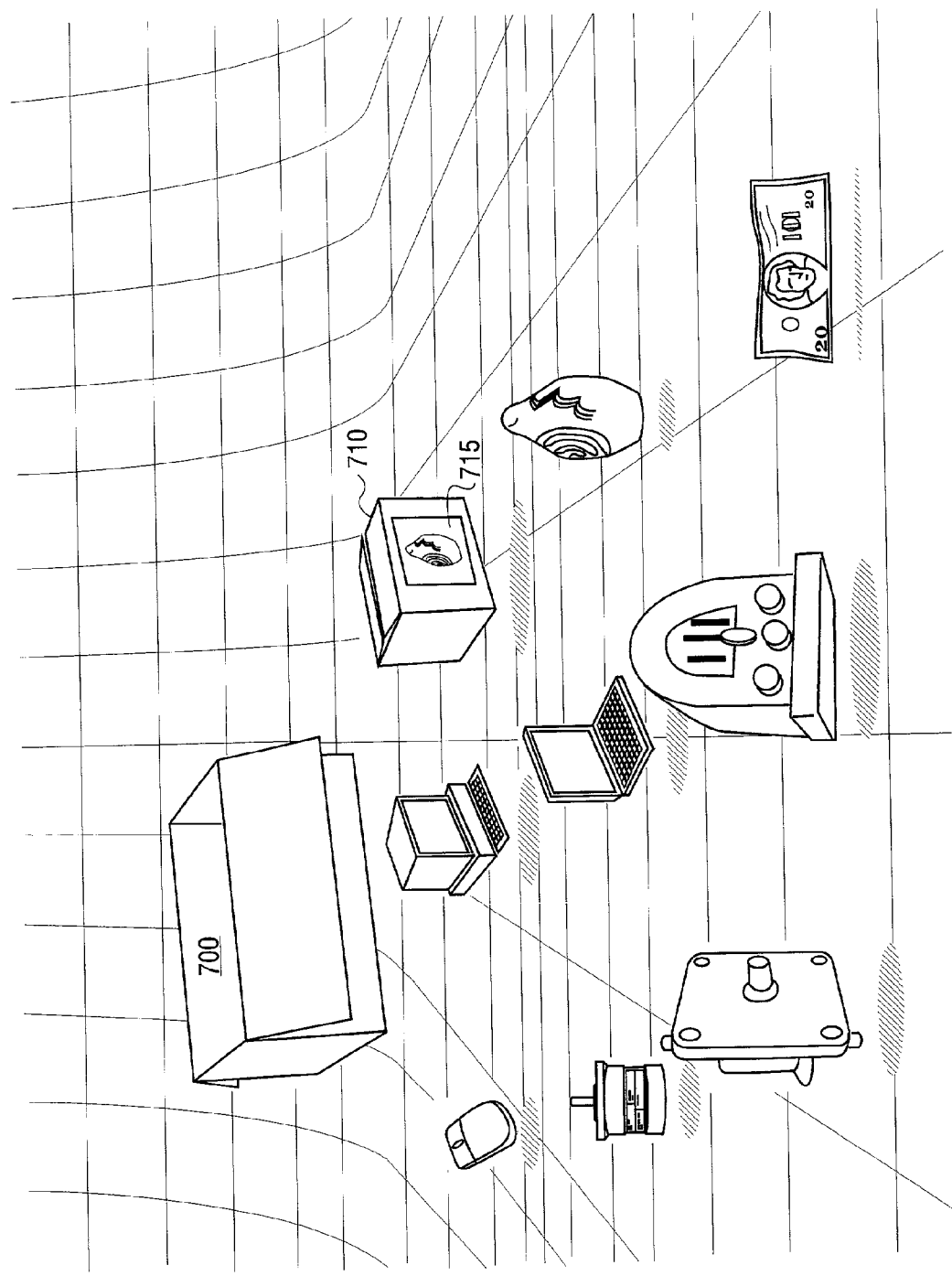
FIG. 7 is a graphical user interface for browsing three-dimensional models as a three-dimensional array in one embodiment of the invention.

FIG. 3 is a graphical user interface for browsing three-dimensional models in one embodiment of the invention. In one embodiment, model box 300 is shown in the navigation pane 320. Model box 300 represents an arbitrary collection of models as selected by a user. The view pane 325 displays the models contained in box 300. These are scale-adjusted 2D views of the actual models stored in model database 230. A scale-adjusted view is a representative view of the model that is scaled up or down so that it will occupy a default amount of space in a view pane 325. In one embodiment, a model in the view pane 325 will rotate when the user positions the mouse over it. Alternatively, the models in the view pane 325 will be automatically rotated in a pre-defined or random sequence. In another embodiment, the view pane 325 could display actual 3D models or scale-adjusted 3D models instead of scale-adjusted 2D views. When a model in view pane 325 is selected, a 3D viewer application is instantiated with the model. Alternatively, when a model is selected a larger size representation of the model could be rendered in the 3D browser navigation pane 320. The models can be arrange in a 2D grid as they appear in FIG. 3, or as a 3D array as shown in FIG. 7. In another embodiment, the models could be presented as a list of model names.

Model box 305 represents a collection of models based on model type. The exterior of model box 305 contains a visual cue 330 of its contents. The visual cue 330 could be a single scale-adjusted view of all models belonging to a category, a category icon, a composite view reflective of characteristics in the group, or any of the scale-adjusted views in the group. If the user were to select model box 305, model box 300 would be displaced by model box 305, and model box 305's contents would be displayed in view pane 325.

The 3D browser can automatically arrange the scale-adjusted views in view pane 325 according to the model category as determined on the fly by the analysis server 215 or as defined by the user. In one embodiment, the visual arrangement might be a spatial grouping where models belonging to the same category are clustered close to one another. In another embodiment, a single scale-adjusted view of all models belonging to a category would be generated to represent the group. This is accomplished by selecting a single scale-adjusted view from the group, generating a composite view reflective of characteristics in the group, or using a stock icon reflective of the group. The composite view is intended to incorporate generation of any image from any subset of models within the group by mere averaging or more intelligent selection.

Figure 4:
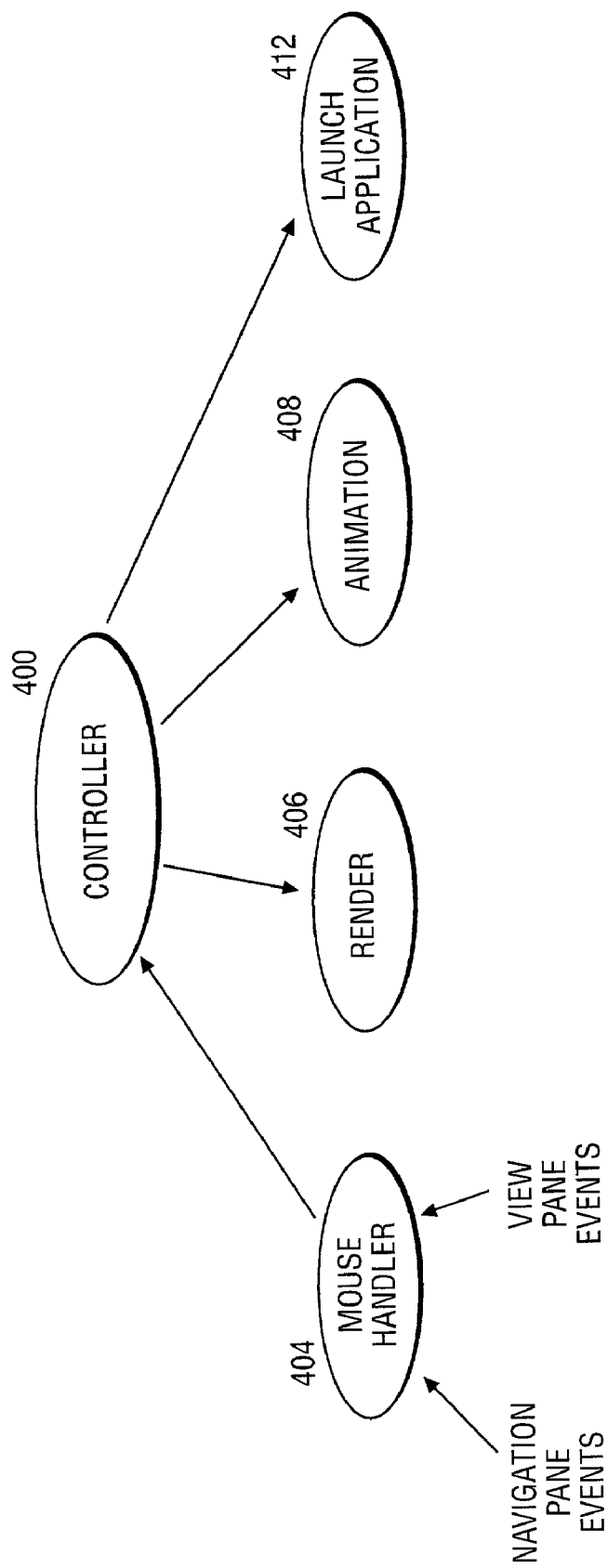
FIG. 4 is a flow diagram of the three-dimensional browser operation in one embodiment of the invention.

FIG. 4 is a flow diagram of the 3D browser operation in one embodiment of the invention. In one embodiment, the 3D browser is implemented in HTML, XML and JavaScript code that executes in a typical web browser. The code for the 3D browser is generated dynamically by the web server 205. Upon initialization, controller 400 communicates with the web server 205 to obtain model categories and the image server 240 to obtain scale-adjusted 2D views of models. The request to the image server is defined as <O, V, H, (x, y), f> where O identifies the model, V is the view definition, H is the highlight, (x, y) is the dimensions of the resulting image, and f identifies the output format (e.g., Graphics Interchange Format ("GIF"), Joint Photographic Experts Group ("JPEG"), etc.). In another embodiment, V is optional and, if omitted, a default view will be provided. The highlight H defines an ellipse to be superimposed over the image to accentuate one or more observable features. Requests for animations take the form <O, (x, y), n>, where O identifies the model, (x, y) is the dimensions of the resulting image, and n is the number of frames in the animation. The model O is rendered in a default view with n rotations of 360°/n about the Y axis. The output is delivered in GIF format.

Upon receipt of a request, image server 240 obtains model viewing permissions from model server 210. If a user lacks the proper credentials to view a model, image server 240 may indicate this to controller 400 which may, in turn, request credentials from the user. Otherwise, image server 240 checks to see if the view image resides in the image cache 250. If so, the image is immediately returned to the controller 400. Otherwise, the image server 240 sends a request to the image generator 245 to generate the view. Once the view is manufactured, the image generator 245 places it in the image cache 250 and notifies the image server 240. The image server 240 then returns the cached image to controller 400. Render module 406 displays the scale-adjusted views as a 2D or 3D array in the view pane 325 and optionally arranges the views by category.

Mouse handler 404 receives mouse events from the navigation pane 320 and the view pane 325. Animation module 408 rotates a model in view pane 325 when the mouse handler 404 indicates to the controller 400 that the user has moved the mouse over the model. Note that model 315 is being rotated. In another embodiment, the animation module 408 may rotate all of the models in view pane 325 in a predetermined sequence. In another embodiment, the animation module 408 may increase the scale of the model when the mouse is moved over it. Launch application module 412 instantiates a 3D viewer application when a model is selected in view pane 325.

Figure 5:
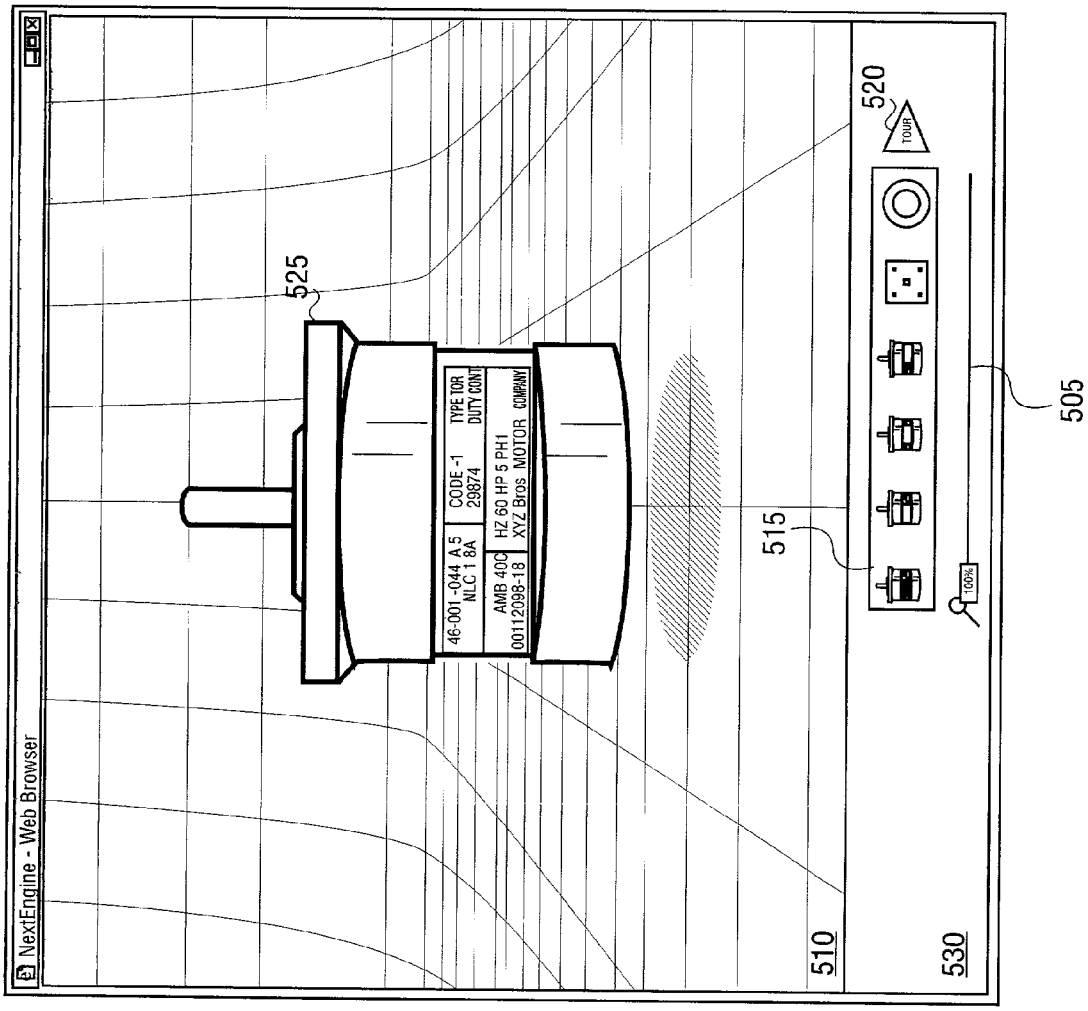
FIG. 5 is a graphical user interface for viewing three-dimensional models in one embodiment of the invention.

FIG. 5 is a graphical user interface for viewing three-dimensional models in one embodiment of the invention. In one embodiment, view pane 510 displays model 525 in 3D. Control pane 500 exhibits several actuatable controls including a magnifier 505 for scaling the model, soft buttons 515 that show different views of interest when actuated, a tour button 520 that when actuated automatically rotates the model through a predefined sequence of views, and user-defined view buttons 515 that when actuated show "favorite" views of the model as defined by the user.

In one embodiment, scale-adjusted views may be used in the creation of soft buttons or other actuatable controls to permit automatic access to the view represented. In another embodiment, names are given to each view (e.g., front, back, top, etc.) and the name is associated with an actuatable control such as a soft button or hyperlink, the actuation of which causes the view to be rendered. In one embodiment, responsive to actuation of a control, the system displays a animation of the object from a currently displayed view to the view corresponding to the control. In another embodiment, the displayed image snaps directly to the view corresponding to the control.

Figure 6:
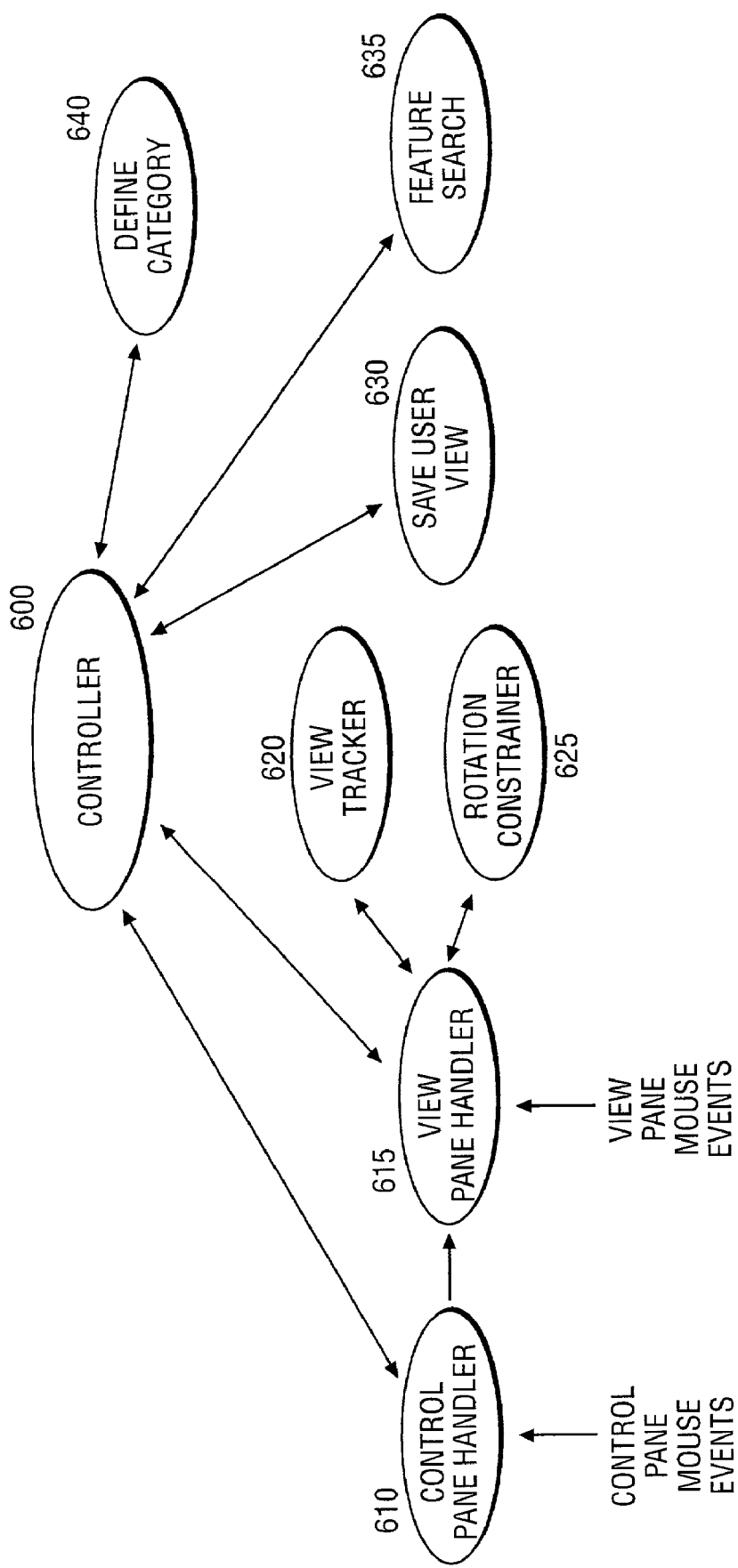
FIG. 6 is a flow diagram of the three-dimensional viewer operation in one embodiment of the operation.

FIG. 6 is a flow diagram of the 3D viewer operation in one embodiment of the operation. In one embodiment, the 3D viewer allows full 3D viewing of a model and is implemented in HTML, XML, and JavaScript code that executes in a web browser enhanced with Macromedia Flash and Viewpoint Media Player plug-ins. The code for the 3D viewer is generated dynamically by the web server 205. Controller 600 communicates with the model server 210 via the web server 205 to obtain a model's geometry, texture map, background, light map, color reference, scale reference, and view definitions. The model server 210 checks to see if the user has credentials to access the requested information. If a user lacks the proper credentials, model server 210 may indicate this to controller 600 which may, in turn, request credentials from the user. Once credentials are verified, if the model server 210 has the requested information in its cache, it immediately sends the information back to the 3D viewer via web server 205. Otherwise, the model server 210 retrieves the information via the database server 220, caches it, and then sends the information back to the 3D browser via the web server 205.

The controller 600 may also communicate with the image server 240 to obtain scale-adjusted 2D views of models based on view definitions received from model server 210. Upon receipt of a request, image server 240 obtains model viewing permissions from model server 210. If a user lacks the proper credentials to view a model, image server 240 may indicate this to controller 600 which may, in turn, request credentials from the user. Otherwise, image server 240 checks to see if the view image resides in the image cache 250. If so, the image is immediately returned to the controller 600. Otherwise, the image server 240 sends a request to the image generator 245 to generate the view. Once the view is manufactured, the image generator 245 places it in the image cache 250 and notifies the image server 240. The image server 240 then returns the cached image to controller 600.

The controller 600 uses the geometry, texture map, light map, color reference, background, and scale reference to instantiate a media player. The background, color reference, and scale reference are optionally displayed. The background can be chosen by the user or in another embodiment it could be selected automatically by the analysis server 215 based on the model's category or other observable characteristics. Scale references may be chosen automatically as a passive indicator such as a uniform size object, e.g., a coin to provide relevant scale information. The uniform size object may be selected automatically to have a size relevant to the object displayed. For example, a dime might not be suitable for a toaster but may be suitable for a ring. Alternatively, a grid, dimension lines, or coordinates may be used. The view pane handler 615 is registered as the media player's mouse event callback routine. The controller 600 instantiates a new flash control and registers the control pane handler 610 as its mouse event callback routine. Control pane 530 is associated with the new flash control. For each view definition received from the model server 210, the controller 600 creates a view button 515 in control pane 530. The button may appear as a scale-adjusted 2D image of the view, the name of the view, or an icon representing the view.

The view pane handler 615 instructs the media player to rotate, translate, or scale the model in response to the mouse drags across the view pane 510. Rotation of the model is aided by rotation constrainer 625 that acts to limit rotation to a single axis when the movement of the mouse falls within a certain tolerance range. This feature is especially useful when viewing a magnified portion of a model since it is difficult to control the accuracy of rotation. In one embodiment, each time view pane handler 615 receives a mouse movement event, the absolute value of changes in mouse position (dx, dy) are added to a queue of n elements where n is the history size. The n queue elements are averaged to produce (adx, ady). Next, the average slope is calculated $$as = \frac{ady}{adx}.$$

If as is greater than a steady threshold st, then $$dx' = dx \cdot \frac{1}{as^2}.$$

This creates the horizontal lock. If $$as < \frac{1}{st},$$

then the new dy is changed dy'=dy·as². This produces the vertical lock. Then (dx',dy') are converted to Euler angles and applied to the current rotation of the object using matrix multiplication. In another embodiment, st may vary as a function of as.

The view tracker 620 takes note of which view of the model the user seems to prefer, if any, and sends this information to the model server 210. A preferred view might be one that the user spends the most time viewing or it could be the view most analyzed. The model server 210 records this information in the model database 230 via database server 220. This information is used by the model server to determine if there is a preferred view of the model among users and if so, the model server 210 can provide this view as a view button 515 in subsequent invocations of the 3D viewer.

The control pane handler 610 responds to mouse events in the control pane 530 by sending commands to the media player. Selection of a view button 515 causes the control pane handler 610 to render the corresponding view. Selection of the magnifier results in the control pane handler 610 scaling the model accordingly. Other flash control buttons work similarly. The user can also save "favorite" views with associated view buttons 515. This is performed by the save user view module 630 which creates the user view button 515 and sends the view information to the model server 210 to be recorded in the user database 225. In another embodiment, the user can save a query result as a set of favorite views, each of which will appear as a view button 515.

Feature search module 635 allows a user to locate occurrences of traits on a model. As discussed previously, a trait is defined as the pair <a, v>, where a is an attribute and v is its value. A query is defined as a logical expression involving traits. A query result is a set of view definitions in which each view contains traits satisfying the query. The user creates a query by selecting stock criteria, newly defined traits, or any combination thereof. Feature search module 635 transmits the user's query to the model server 210 via web server 205. The model server 210 first checks to see if there is a prior search matching the current search stored in its search cache. If so, the model server 210 simply returns the cached result to 3D viewer via web server 205. Otherwise, the model server 210 forwards the query to the analysis server 215. The analysis server 215 executes the query and returns the query result to the model server 210. The model server 210 caches the result and then transmits it to the 3D viewer via web browser 205. In another embodiment, the analysis server 215 may stores the query result in model database 230 so as to avoid duplicating potentially time-consuming analysis in the future. The query result may be displayed as a list of selectable views in the flash control pane. In another embodiment, the results are displayed as text in a results window. Each view, when selected by the user, causes the model to be rotated and magnified to reveal the feature(s) of interest. In another embodiment, the features of interest are highlighted in each view of the model.

The define category module 640 allows a user to create new categories or modify existing categories by defining logical expressions based on model traits. The user specifies a trait by selecting an attribute a from a menu (e.g., overall geometrical shape of the model, surface features as found in the model's 2D texture map, indicia of the object such as characteristic markings, and local detail which includes geometric and textual information for a specific region of the model, etc.) and then selecting a value v from a menu (e.g., a particular geometric shape, a particular color, etc.) or by selecting a region of the model in conformance with the desired trait.

FIG. 7 is a graphical user interface for browsing three-dimensional models as a three-dimensional array in one embodiment of the invention. In one embodiment, model box 700 is rendered in the background. Model box 700 represents an arbitrary collection of models as chosen by a user. The collection of models contained in the model box are rendered in a 3D array in front of the box. The models are scale-adjusted 3D views of the actual models stored in model database 230. In one embodiment, a model will rotate when the user positions the mouse over it. Alternatively, the models will be automatically rotated in a pre-defined or random sequence. In another embodiment, a model will move spatially within the array to give the model greater visibility when the user positions the mouse over it. When a model is selected, a 3D viewer application is instantiated with the model.

Model box 710 represents a collection of models based on model type. The exterior of model box 710 contains a visual cue 715 of its contents. The visual cue 715 could be a single scale-adjusted view of all models belonging to a category, a category icon, a composite view reflective of characteristics in the group, or any of the scale-adjusted views in the group. If the user were to select model box 710, model box 700 would be displaced by model box 710, and the contents of model box 710 would be arrayed before it.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method comprising:
   analyzing a data file representing a three dimensional object to automatically identify a plurality of views of interest based on at least one observable characteristic of the three dimensional object;
   automatically eliminating views with an information content below a threshold; and
   defining an access mechanism to permit the plurality of views to be accessed.

2. The method of claim 1 wherein defining comprises:
   automatically creating an adjusted scale representation of each view of interest; and associating the adjusted scale representation with an actuatable control.

3. The method of claim 1 further comprising:
rendering a representation of the three dimensional object from the data file; and
automatically translating the object to a corresponding view of interest responsive to an actuation of a control associated with a corresponding representation.

4. The method of claim 1 wherein the plurality of views includes all six orthogonal views.

5. The method of claim 1 wherein the information content is determined relative to other views.

6. The method of claim 1 further comprising:
automatically creating a sequence for presenting the plurality of views in a prescribed manner.

7. The method of claim 6 further comprising:
automatically presenting the sequence responsive to an event.

8. The method of claim 1 wherein the characteristic is one of:
shape of the object, texture map of the object, indicia of the object, local detail of the object, and color of the object.

9. The method of claim 1 further comprising:
displaying a representation of the three dimensional object in a viewing window; and
automatically providing a scale indicator that relates to an actual dimension of the three-dimensional object.

10. The method of claim 9 wherein the scale indicator is one of dimension lines, coordinates, a grid, and a reference object.

11. The method of claim 1 further comprising:
displaying a representation of the three dimensional object in a viewing window; and
automatically providing a color reference to allow for calibration of color of a display device.

12. The method of claim 1 further comprising:
displaying a representation of the three dimensional object in a viewing window; and
automatically selecting a display background based on at least one characteristic of the object.

13. The method of claim 1 further comprising:
analyzing a data file representing the three dimensional object to automatically identify at least one observable characteristic of the three dimensional object;
rendering a representation of the three dimensional object from the data file; and
automatically adjusting a virtual light source to light the representation to improve visibility of a characteristic of interest.

14. A method comprising:
analyzing a data file representing a three dimensional object to automatically identify a plurality of views of interest based on at least one observable characteristic of the three dimensional object;
defining an access mechanism to permit the plurality of views to be accessed; and
permitting a user to create an additional access mechanism and associate a user specified view with the additional access mechanism.

15. A method comprising:
analyzing a data file representing a three dimensional object to automatically identify a plurality of views of interest based on at least one observable characteristic of the three dimensional object;
defining an access mechanism to permit the plurality of views to be accessed;

wherein analyzing includes detecting symmetry of the object; and
automatically determining a primary axis of orientation for presentation of the object.

16. The method of claim 15 wherein analyzing the data further comprises:
determining volumetric distribution of features of the object.

17. A method comprising:
analyzing a data file representing a three dimensional object to automatically identify a plurality of views of interest based on at least one observable characteristic of the three dimensional object; and
automatically identifying homogenity exceptions in the object.

18. A method comprising:
rendering a three dimensional representation of an object from a data file;
accepting a definition of a feature of interest;
searching the data file for a region substantially conforming to the definition;
displaying an orientation and magnification that permits viewing of the feature;
tracking user behavior when viewing the representation of the three dimensional object;
inferring from the behavior a view of interest; and
defining an access mechanism to subsequently permit the view to be automatically accessed.

19. The method of claim 18 wherein the definition is given by one of:
at least one stock criterion;
at least one user-specified criterion; and
a combination of user specified and stock criteria.

20. The method of claim 18 wherein the definition includes at least one of:
geometrical shape of the object, surface texture of the object, indicia of the object, and local detail of the object.

21. The method of claim 18 further comprising:
highlighting the feature of interest in the orientation and magnification displayed.

22. The method of claim 18 wherein the view includes a specific orientation and a specific magnification.

23. A method comprising:
analyzing a data file representing a three dimensional object to automatically identify a plurality of views of interest based on at least one observable characteristic of the three dimensional object;
defining an access mechanism to permit the plurality of views to be accessed
displaying a representation of the three dimensional object in a viewing window;
determining if movement of a control device is within a tolerance range; and
automatically constraining rotation of the representation to a single axis if the movement is within the tolerance range.

24. The method of claim 23 wherein the tolerance range is a function of recent activity.

25. A machine readable medium having stored thereon instructions which when executed by a processor cause the machine to perform operations comprising:
analyzing a data file representing a three dimensional object to automatically identify a plurality of views of interest based on at least one observable characteristic of the three dimensional object;

defining an access mechanism to permit the plurality of views to be accessed;
tracking user behavior when viewing a representation of the three dimensional object;
inferring from the behavior a view of interest; and
defining an access mechanism to subsequently permit the view to be automatically accessed.

26. A machine readable medium having stored thereon instructions which when executed by a processor cause the machine to perform operations comprising:
rendering a three dimensional representation of an object from a data file;
accepting a definition of a feature of interest;
searching the data file for a region substantially conforming to the definition;
displaying an orientation and magnification that permits viewing of the feature;
tracking user behavior when viewing the representation of the three dimensional object;
inferring from the behavior a view of interest; and
defining an access mechanism to subsequently permit the view to be automatically accessed.

27. The machine readable medium having stored thereon instructions which when executed by a processor cause the machine to perform operations comprising:
analyzing a data file representing a three dimensional object to automatically identify a plurality of views of interest based on at least one observable characteristic of the three dimensional object;
defining an access mechanism to permit the plurality of views to be accessed;
displaying a representation of the three dimensional object in a viewing window;
determining if movement of a control device is within a tolerance range; and
automatically constraining rotation of the representation to a single axis if the movement is within the tolerance range.

* * * * *